United States Patent [19]

Harte

[11] 3,754,337
[45] Aug. 28, 1973

[54] SELF-INSTRUCTIONAL AND SELF-TESTING APPARATUS

[76] Inventor: James Richard Harte, 10 West Concord, Kansas City, Mo. 64112

[22] Filed: July 29, 1971

[21] Appl. No.: 167,368

Related U.S. Application Data

[63] Continuation-in-part of Ser. No. 141,289, May 7, 1971.

[52] U.S. Cl. .................................. 35/9 R, 35/48 A
[51] Int. Cl. ............................................ G09b 3/08
[58] Field of Search .................... 35/9 R, 9 C, 48 R, 35/48 A

[56] References Cited
UNITED STATES PATENTS

| 1,644,160 | 10/1927 | Thompson | 35/48 A |
| 1,915,653 | 6/1933 | Dutton | 35/48 A |
| 3,477,144 | 11/1969 | Stillit | 35/9 C |

*Primary Examiner*—Wm. H. Grieb
*Attorney*—D. A. N. Chase

[57] ABSTRACT

This apparatus is a simple manually operated self-instructional and self-testing apparatus which has a plurality of holes or depressions of different sizes, shapes, and/or different depths in a solid flat surface; an answer sheet or question and answer sheet; and a stylus with a shaped tip. All question and answer sheets, or answer sheets contain indicator zones that correspond to the multiple choice, true false, or matching questions. In the usual operation of the apparatus answer sheets or question and answer sheets containing indicator zones are positioned on the upper surface of the flat solid structure that contains many specially constructed holes or depressions. When the question and answer sheets are correctly positioned all indicator zones are directly above a hole or depression. The holes or depressions are of several cross sectional sizes, shapes, and/or depths. The student pushes a stylus through the indicator zones he feels correspond to correct answers. The stylus used by the student to perforate the indicator zones of the question and answer sheet is of a special configuration. The stylus is so constructed that when it first penetrates the indicator zone it produces one shape of hole, and if the student is able to push it deeper, or manipulate it further, this first shape is transformed into a second shape, or into a second and then a third shape. The different hole sizes, shapes, and/or depths in the underlying solid surface are the determining factors that limit the depth to which the stylus can penetrate the indicator zone, or be further manipulated in the indicator zone. Thus the size, shape, or depth of the underlying hole or depression will determine what will be the final shape of the hole pattern produced at an indicator zone by manipulation of the stylus. The different shapes of holes produced in the indicator zones indicate the correctness, partial correctness, or incorrectness of the student's responses.

2 Claims, 27 Drawing Figures

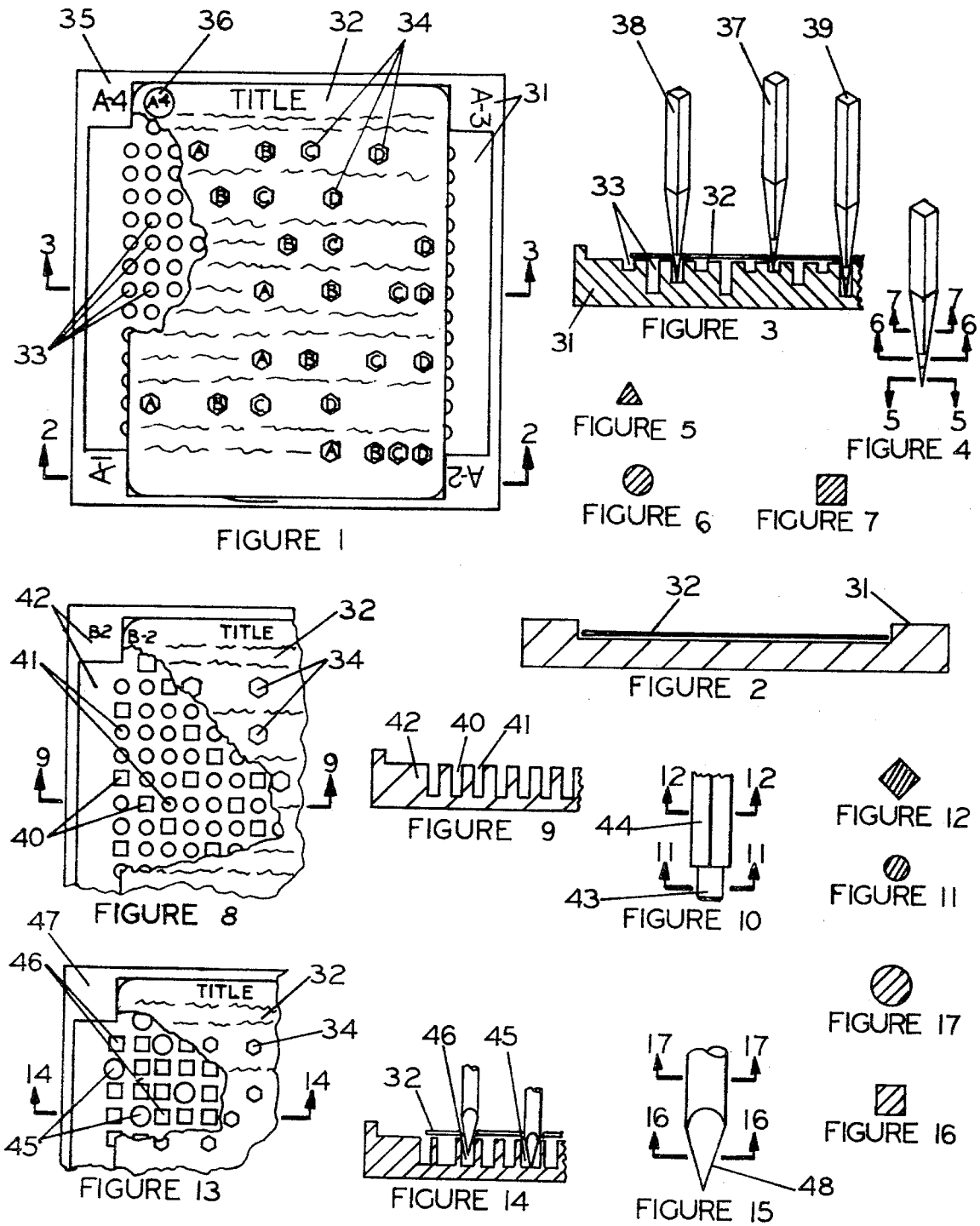

Patented Aug. 28, 1973
3,754,337
2 Sheets-Sheet 2
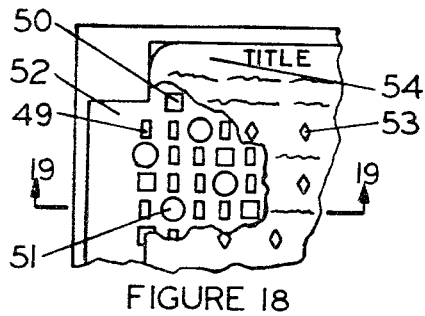
FIGURE 18
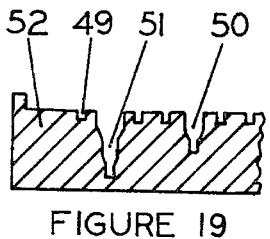
FIGURE 19
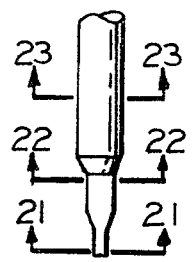
FIGURE 20
FIGURE 21
FIGURE 22
FIGURE 23
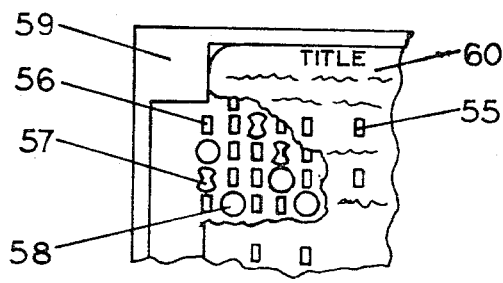
FIGURE 24
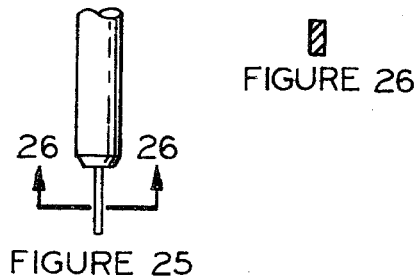
FIGURE 25
FIGURE 26
FIGURE 27
INVENTOR JAMES RICHARD HARTE

3,754,337

SELF-INSTRUCTIONAL AND SELF-TESTING APPARATUS

CROSS-REFERENCE

This application is a continuation-in-part of my copending application, Ser. No. 141,289, filed May 7, 1971.

This invention relates to an educational self-instructional and self-testing apparatus for the teaching of all subjects to persons by means of multiple choice, true false, or matching questions, and accompanying printed and/or pictorial content and instructional material. This invention can be used in conjunction with other means of providing information or questions such as: by visual projection means; audio tape presentation means; or other printed material.

This apparatus allows the instructor to select programs or formats appropriate to the student's level of comprehension of a subject, and to provide the student with a programmed sequence of learning materials. With this invention the student can proceed at his own pace through the educational material. The student also receives immediate feedback as to the correctness or incorrectness of his responses to multiple choice questions, true false questions, or questions matching data in vertical columns with other data in horizontal rows. This invention provides a simple, practical and economical way for an instructor to work with a large group of students in individual programmed instructional sequences. This invention allows for both the student and instructor to keep a permanent record of the student's performance, comprehension, and mastery of skills in different subject areas. This invention allows for a wide variety of types of instructional formats without the use of complex and expensive optical and electronic mechanisms. It also provides a means of analyzing which questions students have the most difficulty with, and of subjecting right and wrong answers to analysis by data processing and computer analysis procedures.

This invention allows for a multiple of correct, partially correct, and incorrect response patterns that makes it extremely difficult for the student to memorize the pattern of the mechanism. It also provides for the automatic scoring of one permanent record of the student's performance.

Another object of this invention is to produce an apparatus which is simple in construction, free of complex maintenance problems, durable, efficient in operation, and adaptable to a wide range of instructional formats with accompanying questions.

Other advantages of this invention and some of its applications will become apparent in the following description and accompanying drawings which disclose the preferred embodiments of this invention wherein:

FIG. 1 is a top view, partly cutaway of a self-instructional apparatus that requires only three parts, question and answer sheet, main frame, and stylus;

FIG. 2 is a cutaway view along line 2—2 showing the question and answer sheet positioned in the main frame;

FIG. 3 is a partial cutaway view along line 3—3 showing correct, partially correct and incorrect answer selections;

FIG. 4 is a stylus with three different cross sectional shapes on the tapered end of the shaft;

FIG. 5 is a cutaway view along line 5—5 of FIG. 4;

FIG. 6 is a cutaway view along line 6—6 of FIG. 4;

FIG. 7 is a cutaway view along line 7—7 of FIG. 4;

FIG. 8 is a top view, partially cutaway of a self-instructional apparatus that utilizes holes of the same depth and width but of different shape in the main body;

FIG. 9 is a partial cutaway view along line 9—9 of FIG. 8;

FIG. 10 is a stylus with two different shapes near the tip of the stylus;

FIG. 11 is a cutaway view along line 11—11 of FIG. 10;

FIG. 12 is a cutaway view along line 12—12 of FIG. 10;

FIG. 13 is a top view, partially cutaway, of a self-instructional apparatus that utilizes holes of the same depth, but of different width and shape in the main body;

FIG. 14 is a partial cutaway view along line 14—14 of FIG. 13;

FIG. 15 is a round stylus with a pyramidal shaped point;

FIG. 16 is a cutaway view along line 16—16 of FIG. 15;

FIG. 17 is a cutaway view along line 17—17 of FIG. 15;

FIG. 18 is a top view, partially cutaway, of a self-instructional apparatus that utilizes holes of different shape and different depth in the main body.

FIG. 19 is a partial cutaway view along line 19—19 of FIG. 18;

FIG. 20 is a stylus with three different cross sectional shapes near its tip;

FIG. 21 is a cutaway view along line 21—21 of FIG. 20;

FIG. 22 is a cutaway view along 22—22 of FIG. 20;

FIG. 23 is a cutaway view along 23—23 of FIG. 20;

FIG. 24 is a top view, partially cutaway of a self-instructional apparatus that utilizes holes of the same depth but different shape in the main body;

FIG. 25 is a stylus with a narrow blade shaped tip;

FIG. 26 is a cutaway view along line 26—26 of FIG. 25;

FIG. 27 is the upper surface of a question and answer sheet, partially cutaway that illustrates how a dual record of the student's performance can be obtained;

One version of the teaching and testing apparatus covered in this invention is shown in FIG. 1. The apparatus consists of a single main frame 31 in the nature of a plate member which has holes in its flat upper surface of two or more different depths, and an overlying question and answer sheet 32. Question and answer sheet 32 is positioned within frame 31 in its normal operation. Frame 31 illustrates a frame that can be used in four different positions. Question and answer sheets 32 are retained in position by the elevated ends and sides of frame 31. Holes 33 of different depth but of the same size are present in frame 31. Indicator zones 34 are so positioned on question and answer sheet 32 so that they overlay underlying holes 33. Location and position marking 35 on frame 31 is to be matched with corresponding marking symbols 36 on the question and answer sheet 32 to assure correct positioning of question and answer sheet 32 within frame 31.

FIG. 2, a cutaway view along line 2—2 shows the question and answer sheet 32 positioned in the main frame. FIG. 3, a partial cutaway view along line 3—3 of FIG. 1 shows three different depths of holes 33. FIG. 3 also shows stylus 37 penetrating question and answer sheet 32 to a shallow depth; stylus 38 penetrating to an intermediate depth, and stylus 39 penetrating to the maximum depth.

FIG. 4 illustrates one type of stylus that can produce two or more different shaped holes when it is used to perforate indicator zones 34 of question and answer sheet 32 of FIG. 1. The stylus illustrated in FIG. 4 has three different cross sectional shapes on the tapered end of its shaft. FIG. 5 is a cutaway view along line 5—5 of FIG. 4 and represents the area near the tip that is of small cross sectional area and of a definite geometric shape. FIG. 6 is a cutaway view along line 6—6 of FIG. 4 and represents a cross sectional area of intermediate size with a distinct, but different shape. FIG. 7 is a cutaway view along line 7—7 of FIG. 4 and is of still a different geometrical shape.

Prepared formats of multiple choice, true false, or matching questions are printed on question and answer sheets. Indicator zones 34, FIG. 1, are located on the question and answer sheets so that when the stylus is pushed through the indicator zone that the student feels is correct, the shape of the resulting hole indicates the correctness, incorrectness, or partial correctness of his response.

FIG. 8 and FIG. 9 illustrate another version of the teaching and testing apparatus covered in this invention. The teaching and testing apparatus illustrated in FIG. 8 and FIG. 9 differs from that illustrated in FIG. 1 and FIG. 3, in that holes 40 and holes 41 both contained in frame 42 are of the same depth, and of similar cross sectional size, but are of different shape. FIG. 10 is a stylus with two different shapes near the tip, in this illustration a shape to produce a circular hole 43 and a shape to produce a square hole 44. FIG. 11, a cutaway view along line 11—11 represents the geometrical shape with the smaller cross sectional area. FIG. 12, a cutaway view along line 12—12 represents the geometrical shape with the larger cross sectional area. When the student thinks he knows the correct response to a question he pushes the tip of the stylus, FIG. 10, through the indicator zone 34 of question and answer sheet 32 positioned within frame 42. The correctness of the response is indicated by the shape of the hole produced in the indicator zone when the tip of the stylus is pushed through the indicator zone and rotated 90° or more.

FIG. 13 and FIG. 14 illustrate another version of the teaching and testing apparatus covered in this invention. This teaching and testing apparatus differs from those noted previously in that though holes 45 and 46 in frame 47 are of the same depth, they are of different geometric shape and of different cross sectional size. For the holes 45 and 46 of frame 47, the stylus, FIG. 15, is so constructed, that the tip 48 can partially penetrate all indicator zones 34 and produce an initial shape of hole in the paper. Stylus tip 48 can only fully penetrate indicator zones 34 when these overlay the larger holes 45 of special geometric shape. FIG. 16, a cutaway view along line 16—16, represents the geometric shape, 48, that has the smaller cross sectional area, and is first to penetrate answer sheet 32 at indicator zone 34. FIG. 17, a cutaway view along line 17—17 represents the geometrical shape with the larger cross sectional area. The correctness or incorrectness of the response selected by the student is indicated by the final shape the student can produce in the indicator zone.

FIGS. 18, 19, 20, 21, 22, and 23 illustrate another version of the teaching and testing apparatus covered in this invention. This version differs from those noted previously in that there are two or more depths of holes and two or more cross sectional shapes of holes 49, 50, and 51 within frame 52. Question and answer sheet 54 has on it specially oriented indicator zones 53 for the insertion of the tip of the stylus represented in one form in FIG. 20. FIG. 21, a cutaway view along line 21—21, represents the first shape to appear in all indicator zones 53 as the stylus FIG. 20 penetrates indicator zones 53. FIG. 22 represents the second shape to appear in some indicator zones, and FIG. 23 represents the third shape to appear in some indicator zones 53. The final shape that appears in indicator zone 53 indicates the correctness, partial correctness, or incorrectness of the student's choice of response.

FIGS. 24, 25, and 26 illustrate another version of the teaching and testing apparatus covered in this invention. This version differs from those noted previously in that the final shape of the hole produced in indicator zone 55 is produced by the student attempting to rotate the stylus of FIG. 25 through 180° after its tip has perforated indicator zone 55 and is resting within one of the holes 56, 57, or 58 within frame 59. FIG. 26, a cutaway view along line 26—26, shows the tip of the stylus of FIG. 25 to be like a narrow blade. When this tip perforates indicator zones 55 which lie over narrow holes 56 in frame 59 little rotation is allowed and a narrow slit appears in indicator zone 55 on answer sheet 60. When the tip perforates an indicator zone 55 that lies over a hole 57 that does not permit a full 180° rotation, a partial rotation will result in a configuration that resembles the shape of hole 57. When the tip perforates an indicator zone 55 that lies over a circular shaped hole 58 the student can rotate the stylus through 180° or more and produce a circular shaped hole in indicator zone 55. The final shape of the hole produced by pushing the stylus of FIG. 25 through indicator zone 55 indicates the correctness, incorrectness, or partial correctness of the student's response.

FIG. 27 is one illustration of a question and answer sheet to be used with this invention that has a detachable bottom section that can be easily torn off by folding and tearing along the line of perforations 61. By the use of this data collection portion the teacher can retain this record of the student's performance. This data collection section can also allow the student's performance to be plotted on a chart, or subjected to data analysis or computer analysis procedure.

What is claimed is:

1. Educational apparatus comprising:
   an instructional sheet having zones thereon for indicating answers selected in response to questions;
   a plate member provided with a flat surface for receiving said sheet and having a number of holes therein of at least two different cross-sectional geometric shapes for indicating whether answers selected on said sheet are correct;
   means on said member for holding said sheet in overlying relationship with said surface in a predetermined position where said zones are aligned with certain of the holes in said surface in accordance with the answers represented by said zones; and a stylus having a blade-like tip for punching through selected zones into the holes therebeneath, all of said holes being configured to fully receive said tip upon insertion thereunto, said different shapes of holes permitting different degrees of rotation of said tip within each hole after full insertion of the tip thereinto, depending upon the hole corresponding to each selected zone, whereby the final shapes of the openings punched into said sheet after rotation of said stylus indicate the correctness of the selected answers.

2. The apparatus as claimed in claim 1, wherein there are three of said different geometric shapes for indicating whether answers selected on said sheet are correct, partially correct, or incorrect.

* * * * *